United States Patent [19]

Raine

[11] Patent Number: 4,649,724

[45] Date of Patent: Mar. 17, 1987

[54] VEHICLE IMMOBILIZATION DEVICE

[76] Inventor: Edward M. Raine, 4 Fountains Close, West Bridgford, Nottingham NG2 6LL, United Kingdom

[21] Appl. No.: 772,340

[22] PCT Filed: Dec. 20, 1984

[86] PCT No.: PCT/GB84/00443

§ 371 Date: Aug. 20, 1985

§ 102(e) Date: Aug. 20, 1985

[87] PCT Pub. No.: WO85/02823

PCT Pub. Date: Jul. 4, 1985

[30] Foreign Application Priority Data

| Dec. 22, 1983 | [GB] | United Kingdom | 8334123 |
| Feb. 7, 1984 | [GB] | United Kingdom | 8402751 |
| Feb. 17, 1984 | [GB] | United Kingdom | 8404165 |
| Jun. 5, 1984 | [GB] | United Kingdom | 8414296 |
| Nov. 22, 1984 | [GB] | United Kingdom | 8429514 |

[51] Int. Cl.⁴ .................. B60R 25/00; E05B 65/12
[52] U.S. Cl. ......................... 70/226; 188/32; 70/225; 70/237; 70/259
[58] Field of Search ............ 70/220, 225, 226, 233, 70/235, 14, 18, 259, 237, 461; 188/32

[56] References Cited

U.S. PATENT DOCUMENTS

| 2,413,744 | 1/1947 | Carter | 188/32 |
| 3,189,127 | 6/1965 | Karnow et al. | 188/32 |
| 3,907,072 | 9/1975 | Shafer | 70/226 |
| 4,031,983 | 6/1977 | Lentini | 188/32 |

FOREIGN PATENT DOCUMENTS

| 2,357,290 | 5/1975 | Fed. Rep. of Germany | 70/226 |
| 675784 | 2/1930 | France | 188/32 |
| 1026347 | 4/1953 | France | 70/14 |
| 0076348 | 5/1983 | Japan | 70/225 |
| 202711 | 6/1965 | Sweden | 188/32 |

OTHER PUBLICATIONS

Popular Science Magazine, Sep. 1984, p. 93.

Primary Examiner—Gary L. Smith
Assistant Examiner—Suzanne L. Dino
Attorney, Agent, or Firm—Cumpston & Shaw

[57] ABSTRACT

A vehicle immobilization device comprises a pair of chocks (1 and 2) for abutting a vehicle wheel on either side (in a direction of rotation) of its ground contact point, a top hook (7) for hooking over the wheel at a point over the ground contact point, a chock arm (3, 4) secured to each chock, the chock arms being relatively movable to adjust the separation of the chocks, and an adjustable length stem (5) for connecting the top hook to the chock arms and including a lock (6) to arms (3 and 4) include oppositely facing channels (9 and 10) with complementary corrugated strips (41 and 42) which are interengageable to prevent relative movement of the chock arms at one of a plurality of positions in which the stem can be locked to the chock arms, by movement normal to the direction of chock separation adjustment. The stem (5) has a foot channel (44) opening downwardly which is engageable over the interengaged channels (9 and 10) to prevent relative movement of the corrugated strips normal to the direction of chock separation adjustment.

28 Claims, 31 Drawing Figures

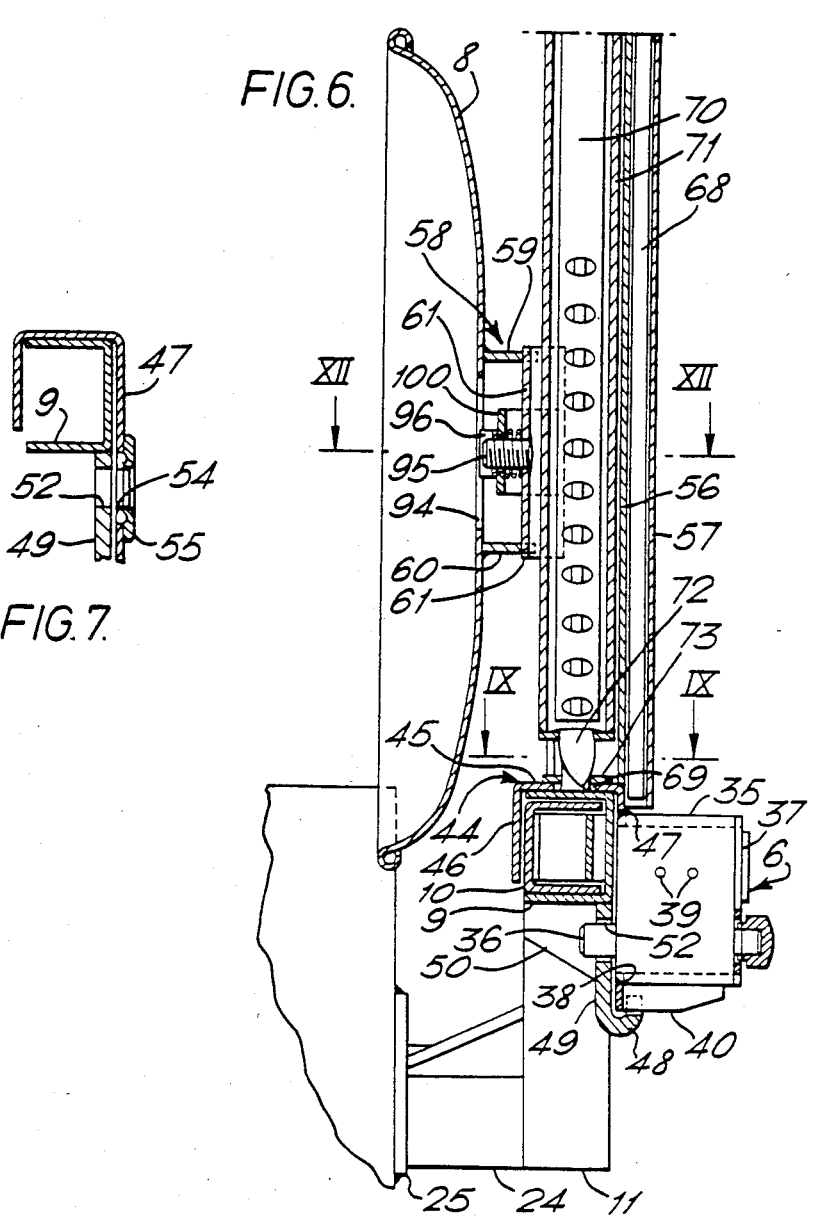

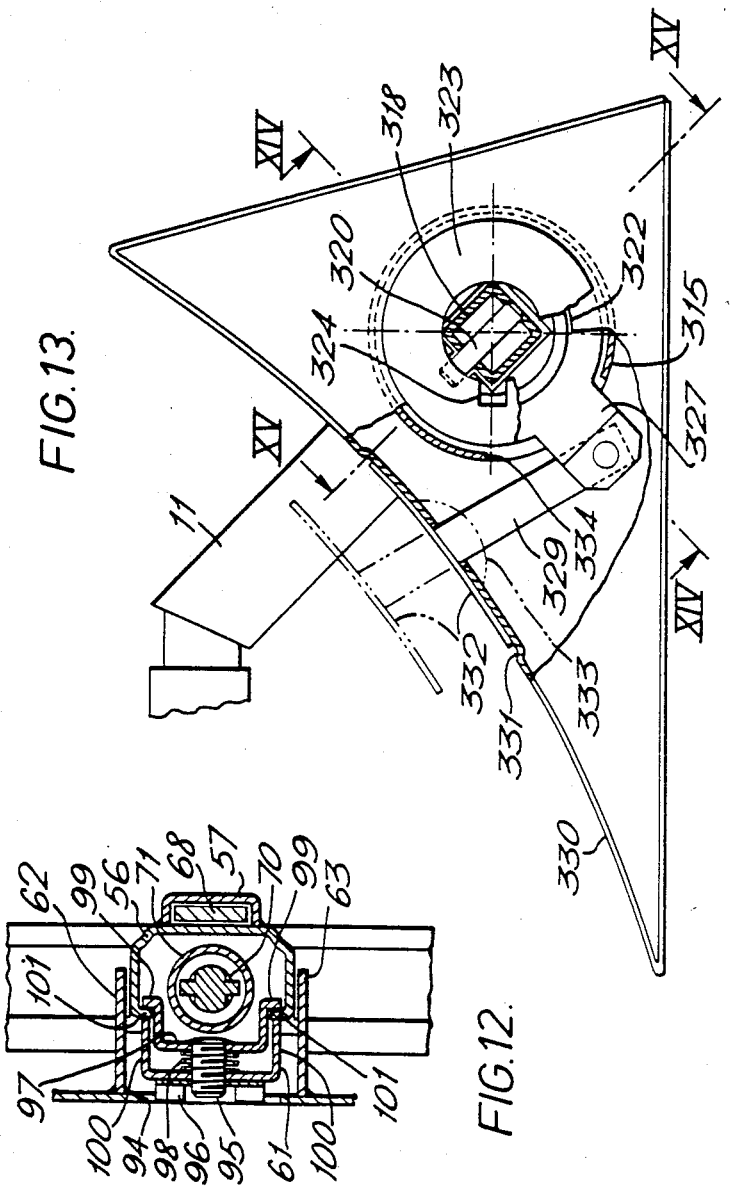

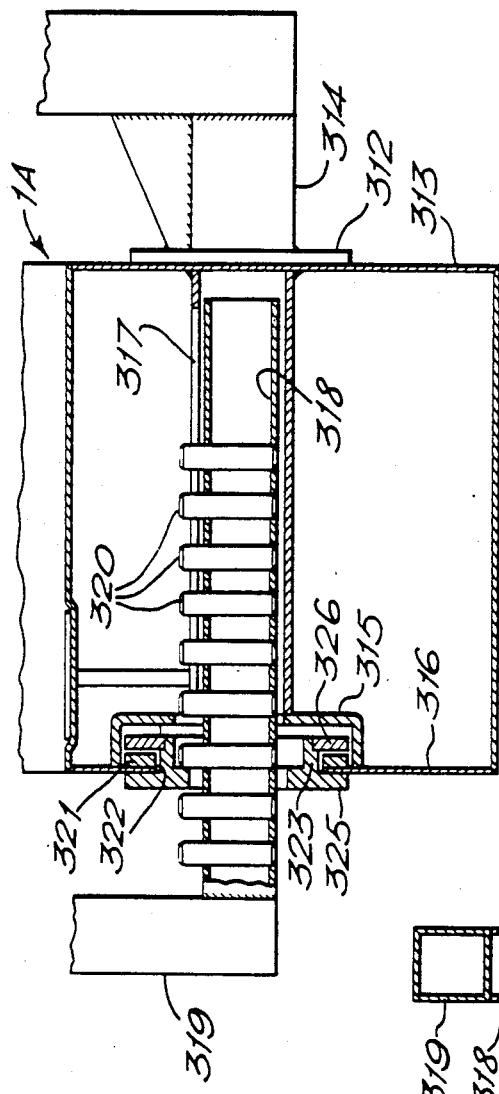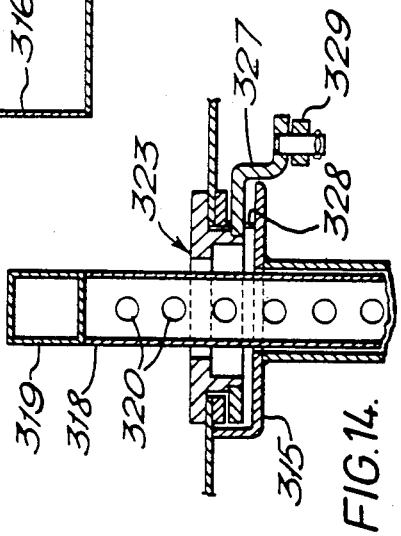

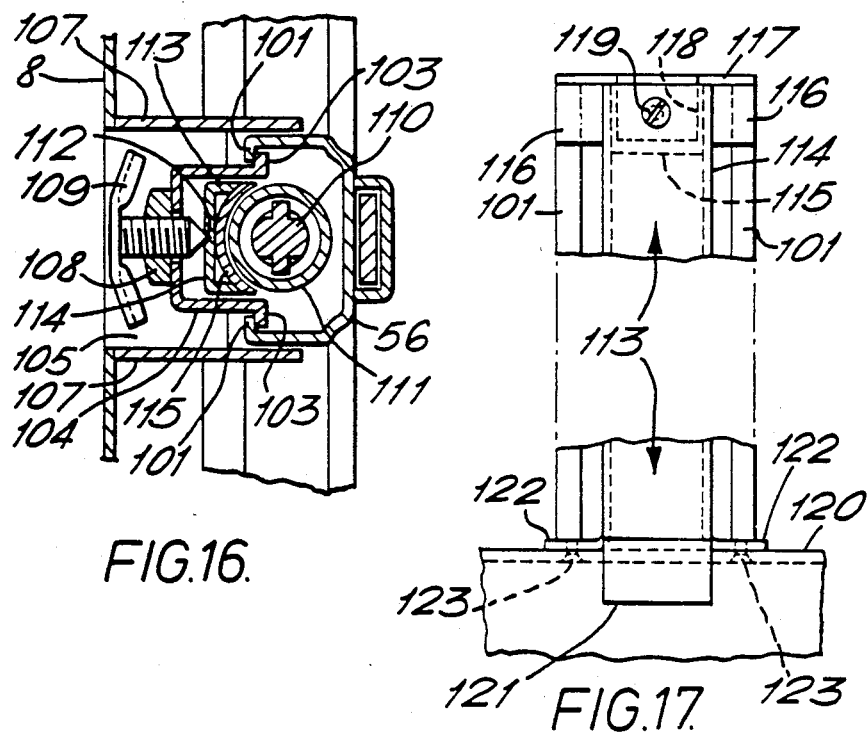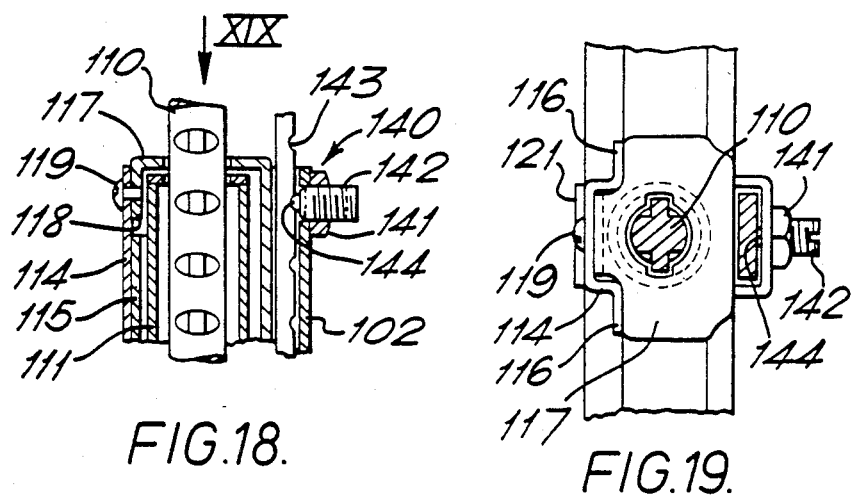

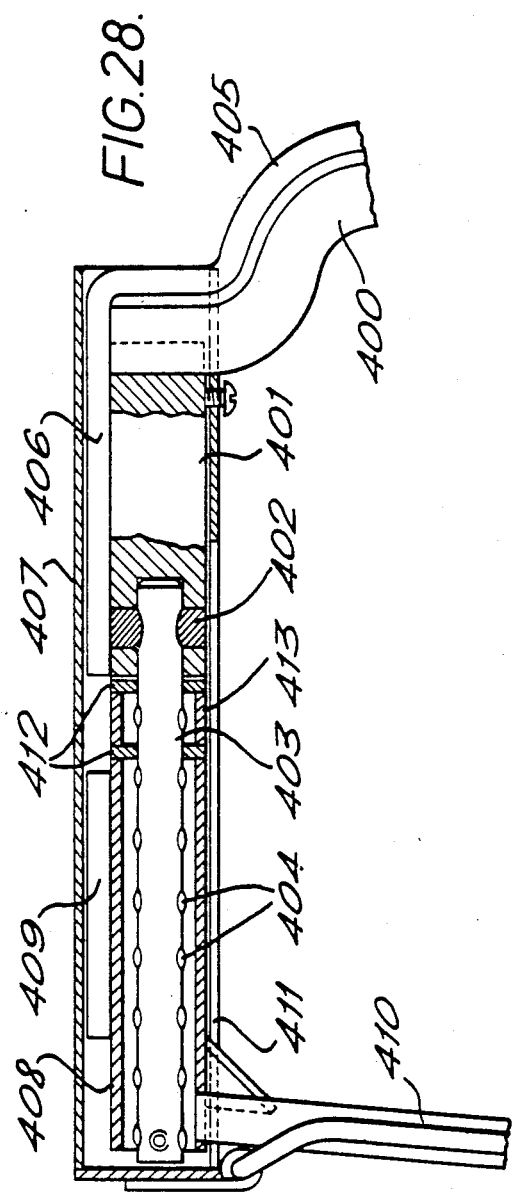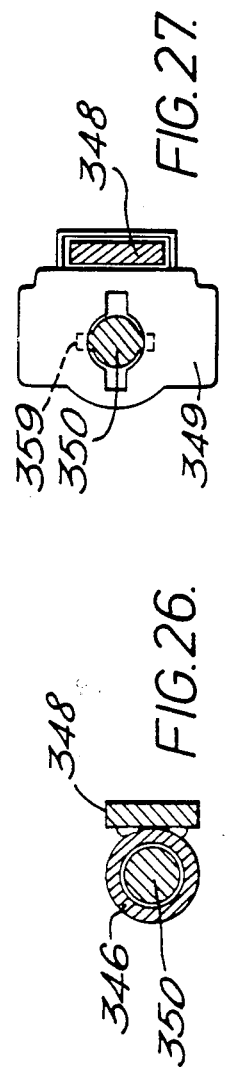

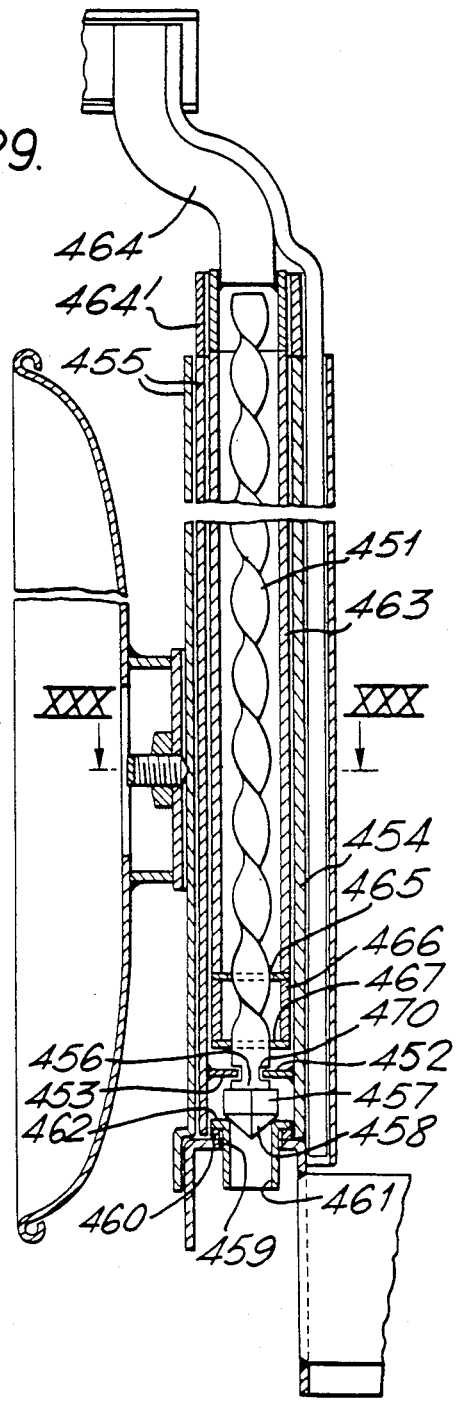
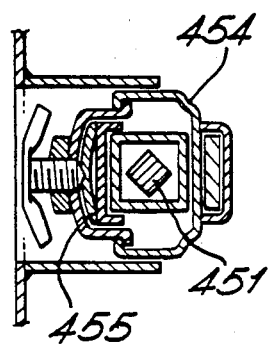
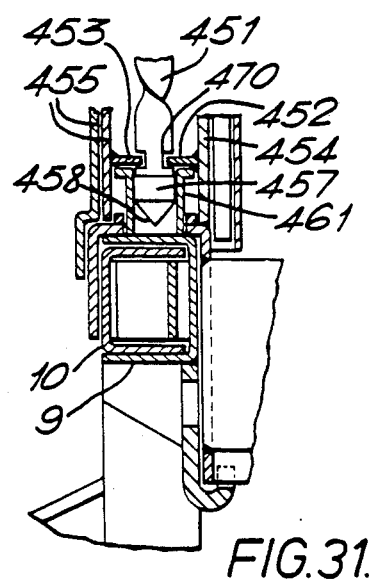
FIG.29.
FIG.30.
FIG.31.

VEHICLE IMMOBILIZATION DEVICE

FIELD OF THE INVENTION

This invention relates to vehicle immobilisation devices of the type (hereinafter referred to as "of the type defined") comprising a pair of chocks for abutting a vehicle wheel on either side (in a direction of rotation) of its ground contact point, a top hook for hooking over the wheel at a point above the ground contact point, a stem for interconnecting the top hook and the chock arms and means for locking the chocks and the stem together in their respective positions, whereby to captivate the vehicle wheel.

BACKGROUND ART

Vehicle immobilisation devices of the type defined are disclosed in U.S. patent application No. 3,695,071 and GB-A-No.2,112,725. In U.S. patent application No. 3,695,071, the relatative positions of the chocks and top hook can be adjusted to suit the diameter of the particular vehicle wheel to which the device is to be applied. The arrangement involves three arms connected to the chocks and top hook, respectively. Two arms have sets of spaced slots, and the third arm has a tenon which is adjustably mounted thereon. To obtain the necessary spacing between the parts, all three arms and the chocks and top hook have to be placed in position and the tenon adjusted and passed through the correct slots in the other two arms, before locking can take place. Thus the device cannot readily be presented to a vehicle wheel of unknown size, adjusted quickly and locked thereto.

GB-A-No.2,112,725 describes an arrangement in which two chocks are joined together by telescopic members which can be locked together by aligning holes therein and inserting the straight portion of a stem or locking bar carrying the top hook through the aligned holes. The problem of aligning two holes in telescopic members sufficiently accurately to receive a well fitting bar is clear. The device actually manufactured by the applicants of the application GB-A-No.2,112,725 used a locking arrangement differing slightly from that described in the application. A pin on the locking bar still passed through a pair of alignable apertures (a plurality being provided) in the telescopically arranged chock arms, but a separate plate was provided depending from the outer of the telescopic arms. The shield extended down to the plate, an aperture in the shield aligned with one of a plurality of apertures in the plate and a padlock was passed through the aligned shield and plate apertures.

An alternative arrangement is described in application GB-A-No.2,112,725 whereby respective chock arms on each chock are connected in a telescopic manner by a separate tube. When the device is fitted the two arms lie side by side having entered the tube from opposite sides thereof, and are slidable in the tube to adjust the distance between the chocks. The top of the tube has a slot in it and the two arms are notched on their upper surfaces in at least one position each. When the device is correctly fitted, notches in the arms line up with the slot in the tube, and means is provided to engage the slot and notches to lock the arms against the separation.

Both these arrangements depend for their locking on the chock arms being in the correct position relative to the locking means for locking to be possible.

DISCLOSURE OF THE INVENTION

The invention seeks to provide a vehicle immobilisation device of the type defined in which the correct separation of the chocks ready for locking can be achieved in a simple and quick manner.

The present invention provides that the stem can only be offered up to the chock arms for locking, when the chocks are correctly spaced for locking of the immobilisation device.

To this end, there is provided, according to the invention, a vehicle immobilisation device of the type defined, including on each chock arm respective engagement members which are interengageable at one or more selected separations of the chocks to enable the stem to be subsequently fitted and locked onto the chock arms thereby securing the chocks at their selected separation.

Preferably, according to the invention, a vehicle immobilisation device comprises a pair of chocks for abutting a vehicle wheel on either side (in a direction of rotation) of its ground contact point, a top hook for hooking over the wheel at a point over the ground contact point, a chock arm secured to each chock, the chock arms being relatively movable to adjust the separation of the chocks, a stem for interconnecting the top hook and the chock arms, and means for locking the chock arms and top hook together in their respective positions whereby to captivate the vehicle wheel and is characterised in that each chock arm has an engagement member; in that the engagement members are interengageable at one of a plurality of relative positions corresponding to positions in which the chock arms and top hook are lockable, by relative movement towards each other in a direction normal to the direction of chock separation adjustment to prevent relative movement of the chock arms, and are disengageable by relative movement away from each other in the same direction to permit such relative movement; and in that the stem is lockable to the chock arms, with the engagement members interengaged, to prevent relative movement in the disengagement direction.

The engagement members may take the form of one or more pins on one chock arm engageable with one or more apertures on the other arm. Alternatively, as is preferred, the engagement members may be in the form of a plurality of teeth provided respectively on each chock arm. For instance, the teeth may be in the form of pegs welded transversely of the longitudinal direction of one arm and of the direction of engagement and in the form of a plurality of cut-outs in the other chock arm. However, the teeth are preferably in the form of a pair of complementarily shaped corrugated members. Because the corrugated members can be initially engaged over a range of imprecise separations but move the chocks to a selected separation on final engagement, a vehicle immobilisation device incorporating them is particularly easy to fit to a wheel.

The securement of the chocks at their selected separation may be achieved either by the action of fitting of the stem or by the action of locking of the stem. For instance, where the interengagement of the engagement members and the fitting of the stem both occur in the same direction it is envisaged that the action of locking of the stem to the arms will lock their separation by preventing their disengagement the one from the other. However, where the interengagement of the engagement members and the fitting of the stem occur in different directions, typically at right angles, the mere fitting of the stem will normally, it is envisaged, prevent the disengagement of the engagement members which thereby lock the separation of the chocks.

For instance, the stem will normally be fitted by being lowered onto the arms. Where, as is preferred, the stem has a downwardly open channel into which the arms pass on fitting, where the arms disengage vertically they may still be disengaged after fitting of the channel over them. However, where they disengage sideways, the fitting of the channel will prevent their disengagement. Of course the stem may be provided with means other than a channel for fitting of the chock arms. For instance, one or both flanges of the channel may be replaced by pins engaging in or on one or other side of one or both of the chock arms.

Although the chock arms may be automatically moved to one of their locking positions, the stem has still to be accurately positioned longitudinally of the chock arms for alignment with a locking aperture in one of the chock arms. Once aligned with one of the apertures, the bolt of the lock can be engaged in one of the locking apertures.

Another feature of the present invention is the provision of formations on the stem and one of the chock arms, which allow the stem to be dropped onto the chock arms, slid sideways to drop further into lateral engagement with the chock arms and then be locked in position. Thus the need for conscious alignment of the component parts during the fitting of the vehicle immobilisation device is obviated.

The formations may be in the form of meshing members interengageable at one of several positions of the stem longitudinally of the one chock arm, the arrangement being such that the stem is laterally slidable until the or one of the selectable positions are approached or reached whereupon the stem drops into mesh with one chock arm.

Although the meshing members may be such that meshing only occurs when one of the positions is reached, preferably they are tapered such that after initial engagement the stem is moved sideways for final positioning.

According to another aspect of the invention, there is provided a vehicle immobilisation device of the type defined including, for each chock, an outer chock arm for connecting the chock to the locking means, which chock arm is pivotally connected to its chock, an inner chock hook which is slidable laterally of the chock arm for adjusting the width between itself and the chock arm in one pivotal position of the chock arm and which is locked in an adjusted width position in another angular position, in which the device is usable, of the chock arm.

Preferably the chock arm has an angled portion pivotally passing through its chock and the inner hook has an angled portion slidably received in the angled portion of the chock arm.

Preferably the angled portion of the chock arm is axially fixed with respect to the chock and the angled portion of the inner hook has a plurality of spigots engaging in a slot in the angled portion of the chock arm. The one(s) of the spigots adjacent an inner faceplate of the chock engage therewith in all pivotal positions of the chock arm and inner hook other than the adjustment/release position in which the spigots align with a slot in the inner faceplate whereby the lateral position of the inner hook may be adjusted.

Preferably the chock arm is restricted from being angularly pivotable beyond the position in which the inner hook is free for adjustment and in the other direction beyond the use position.

According to another aspect of the present invention, there is provided a vehicle immobilisation device of the type defined including, for each chock, an outer chock arm for connecting the chock to the locking bar, an inner chock hook which is slidable laterally of the chock arm for adjusting the width between itself and the chock arm, and a hook locking arrangement for permitting the adjustment in one angular position thereof and for locking the chock arm and inner hook in an adjusted width position in another angular position of the hook locking arrangement. The inner hook may have a plurality of spaced spigots.

The chock arm may be fixed to the chock and a collar with a notch provided at the inner face of the chock, the collar being rotatable between the adjustment/release position—in which the spigots are free to pass through the notch—and a locking position—in which the collar engages with adjacent one(s) of the spigots to lock the position of the hook with respect to the chock arm.

The slot could be provided in the hook, the spigots fixed to the chock arm and the collar provided at the outer face of the chock. With the preferred configuration of the hook being locked, the collar may be provided internally of the chock inner face. Other means could be provided for guiding the hook at its preferred orientation namely at right angles to the inner face of the chock.

The hook locking arrangement includes means for turning the collar. With the collar on the inner face of the chock, the collar could be turned by an exposed lever. However this is not secure and could lead to the hook being unlocked and the immobilisation device being removed from the vehicle without authorisation. Accordingly it is preferred that the collar be turned by means which is obscured when the device is locked onto a wheel. The means may be a lever operated from below the chock and obscured by the ground when the device is fitted. Alternatively, as is preferred, the means may be a lever protruding from the tire face of the chock and depressed when in contact with the tire. The lever may be manually raisable from the tire face or may be spring raisable.

According to another aspect of the present invention, there is provided a vehicle immobilisation device of the type defined, including a member on the stem which is rotatable to free a vertical extending member to move vertically for adjustment of the top hook, and means to lock the angular position of rotatable means, thereby locking the vertical height of the device.

The vertically extending member may be a crimped bar or rod. Alternatively it may be a suitably crimped or slotted tube. In a slightly different arrangement, the vertically extending member may have only a single engagement member such as a key hole slot and the rotatable member may be a crimped bar or the like.

The rotatable member may be manually rotatable as a separate operation to the assembly of the immobilisation device. For instance, the rotatable member may be provided with knurling for rotation by thumb or it may be provided with a lever. Similarly the rotatable member may be locked against rotation by a manually engageable lock. For instance a wheel nut shield may be adjustably clamped to the stem via a bolt engaging in one of a series of dimples alignable with the bolt only when the rotatable member is in its position locking the vertically extending member.

However the action of locking is preferably effected by lifting the rotatable member with respect to the stem, the lifting engaging a dog clutch between the rotatable member and the stem. The lifting is preferably effected by dropping of the stem onto the chock arms of the device, when a spigot attached to the rotatable member engages with the chock arms and lifts the rotatable member with respect to the rest of the stem. In the preferred embodiment, the spigot is threaded, with a fast screw thread, and engages with the stem, whereby lifting of the rotatable member additionally causes the rotation thereof. The threaded spigot and its engagement with the stem thus provides the lock for the rotatable member which cannot be rotated for unlocking of the vertically extending member once it has been lifted.

In order to hold the height of the top hook temporarily or to provide a degree of presetting of the height adjustment of the stem, a ball catch may be provided on the stem.

To help in the understanding of the invention, a specific embodiment thereof, together with various alternatives, will now be described by way of example and with reference to the accompanying drawings.

BRIEF DESCRIPTION OF THE DRAWINGS.

FIG. 6 is a sectional side view, partly broken away, on the line VI—VI of FIG. 1;

FIG. 7 is a sectional view on the line VII—VII of FIG. 1, showing a padlock position;

FIG. 12 is a sectional plan view on the line XII—XII of FIG. 6;

FIG. 13 is a partially cut-away back view of an alternative form of chock;

FIG. 14 is a sectional view, partly broken away, on the line XIV—XIV of FIG. 13;

FIG. 15 is a sectional view, partly broken away, on the line XV—XV of FIG. 14;

FIG. 16 is a cross-sectional plan view similar to FIG. 12 of an alternative wheelnut shield locking arrangement;

FIG. 17 is a rear view of the top and bottom ends of the wheelnut shield locking channel of FIG. 16;

FIG. 18 is a scrap sectional side view of the top end of the channel shown in FIG. 17;

FIG. 19 is a plan view on arrow XIX in FIG. 18;

FIG. 26 is a sectional view on the line XXVI—XXVI of FIG. 24;

FIG. 27 is a sectional view on the line XXVII—XXVII of FIG. 24;

FIG. 28 is a cross-sectional side view of an alternative top hook;

FIG. 29 is a cross-sectional side view of an alternative stem prior to fitting;

FIG. 30 is a scrap cross-sectional view on the line XXX—XXX in FIG. 29; and

FIG. 31 is a scrap view of the lower portion of the locking bar of FIG. 29 when fitted to chock arms.

DESCRIPTION OF THE BEST MODE OF CARRYING OUT THE INVENTION

Figure 1:
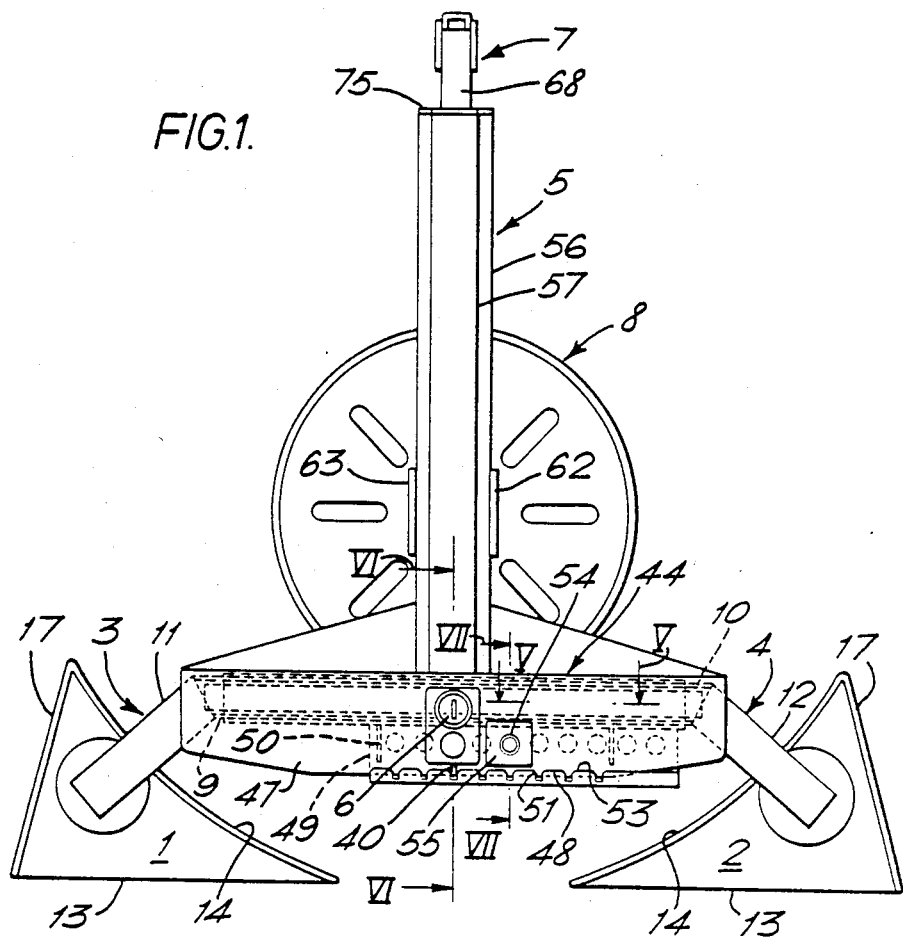
FIG. 1 is a front elevational view of a vehicle immobilisation device according to the present invention.

A vehicle immobilisation device (FIG. 1) has two wheel chocks 1,2 interconnectable through chock arms 3,4. A stem 5 is lockable to the chock arms by a lock 6 and carries a top hook 7 and a wheelnut shield 8. The chock arms 3,4 have square section tubular sloping portions 11,12 and horizontal portions or channels 9,10 which are channel shaped.

The chocks 1 and 2 are of plate steel and each chock has a ground plate 13. Each chock is in the form of a welded box comprising a curved wheel abutment or tire face 14 and an end face 17, which are of one piece, and a front or outer chock side 15 and a rear or inner side 15, which sides are of one piece with the ground plate 13. A circular aperture 18 is formed in the front side 15, with a reinforcing washer 19 welded around the aperture on the inside of the side 15. The rear side 16 has an aligned circular aperture 20 with a notch 21 in its upper periphery. A pin 22 passes through a reinforcing washer 23 around the aperture 20 and through the side 16 to project rearwardly from the surface thereof below the aperture 20. The notch 21 extends through the reinforcing washer 23.

The sloping square section tubular portion 11 of the chock arm 3 has welded thereto at right angles at its chock end, a square-section tubular extension 24. The extension 24 passes through the apertures 18 and 20 and is held there between a collar 25, which surrounds and is welded to the extension 24 and engages the outer face of the side 15, and a flange 26, which surrounds and is welded to the end of the extension 24 and lies beyond and close to the outer face of the rear side 16. Part of the periphery of the flange 26 is cut away at 28 to provide space for the pin 22 between the ends of the cutaway portion. This allows the chock arm to rotate relative to the chock through an angle determined by the length of the cutaway at 28, the extension 24 rotating in the apertures 18 and 20. Within the extension 24 is located another square-section tube 29 which forms an extension welded at right angles to the end of an inner hook 30 of square section tubular form. The inner hook 30, like the sloping portion 11 of the chock arm, extends obliquely up from the chock in the locked position and has a short horizontal part. The tube extension 29 has a plurality of pins 31 welded therein to project from one side thereof in alignment at spaced intervals. The pins 31 project through a longitudinal slot 32 in the tubular extension 24. With the parts in the unlocked adjustment position (FIG. 4), the inner hook 30 and the portion 11 of the chock arm 3 are swung clear of the tire face 14 and the pin 22 limits further rotation by engaging the flange 26 at one end of the cutaway 28. In this unlocked position, the pins 31 and slot 32 are aligned with the notch 21 in the aperture 20 and the corresponding reinforcing washer 23. A slot 33 in the flange 26 forms a continuation of the slot 32. In this position the spacing between the inner hook and the chock arm can be adjusted to the width of the tire of the vehicle to be immobilised by drawing the tube extension 29 out of the tubular extension 24, the pins 31 passing along the slot 32 and through the notch 21 and slot 33. When the correct spacing is achieved, the inner hook and chock arm are rotated back to the locked position (FIG. 3) in which the pin 22 engages the other end of the cutaway 28 of the flange 26 to limit rotation. The side 16 and the washer 23 are then trapped between two of the pins 31 because the notch 21 is no longer aligned with the pins 31, slot 32 and slot 33.

Figure 3:
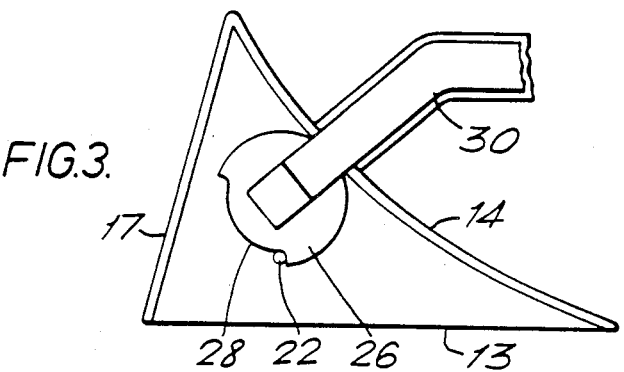
FIG. 3 is a side view of the chock of FIG. 2 with the parts in locked position.
Figure 4:
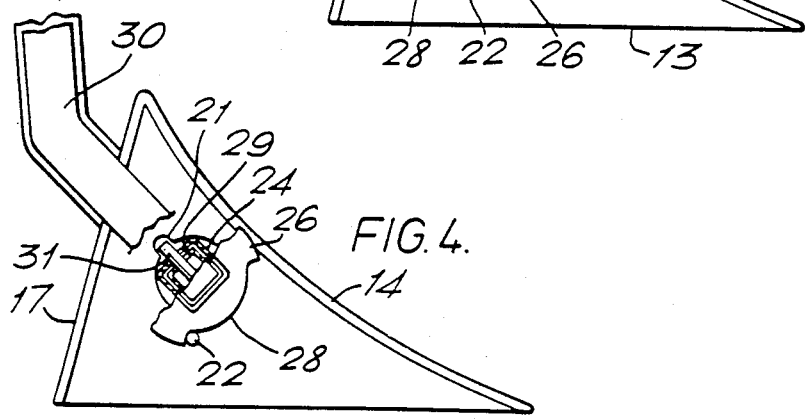
FIG. 4 is a view similar to FIG. 3, but with the parts in unlocked position and partly broken away and in section.

It will be appreciated that with both the inner hook and the chock arm swung clear of the tire face of the chock (FIG. 4), the chock can be introduced into position from the side of a vehicle wheel and the spacing between the inner hook and chock arm then adjusted before the chock arm and inner hook are swung back to the locked position extending normally across the tire face (FIG. 3).

It will also be appreciated that the chock 1 has a similar inner hook and width adjustment arrangement, but that the arrangements are left and right handed, respectively.

The channel 9 attached to the left hand chock 1 opens rearwardly or inwardly and in use houses the narrower channel 10 which opens forwardly or outwardly and is attached to the right hand chock 2. Contained within the channels are complementary corrugated strips 41,42. The strips 41,42 are welded at their peaks to their respective channels via plug welds 43 in slots stamped in the webs of the channels prior to forming of the channels to shape.

The channels 9 and 10 can be separated laterally and moved longitudinally relative to each other, the unattached peaks of the strips 41 and 42 passing each other. When the channels 9 and 10 are in a desired position setting the distance between the chocks 1 and 2, the channels can be brought together laterally, with the channel 10 engaging in the channel 9 and with the corrugated strips 41 and 42 in register, as they must be for the channels to be engaged. The chocks 1 and 2 will then be separated by a distance which is one of a plurality of separation distances which differ by the pitch of the corrugations of the strips. The action of placing the chock arms togegher involves moving them together laterally of their extension. Once they are engaged together, with the corrugated strips engaging in register, they cannot be pulled apart longitudinally of their extension until they move apart laterally. The shape of the corrugated strips can vary. They may have a saw tooth form. They may be replaced by saw tooth blocks. Only a limited number of teeth/corrugations may be provided to suit the device to a limited range of tire sizes. The corrugations may be replaced by square sided blocks.

Figure 5:
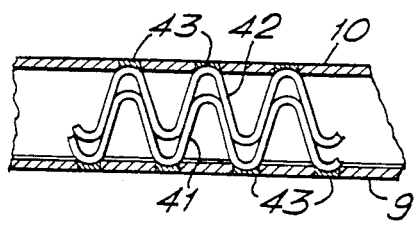
FIG. 5 is a scrap view on the line V—V of FIG. 1.
Figure 2:
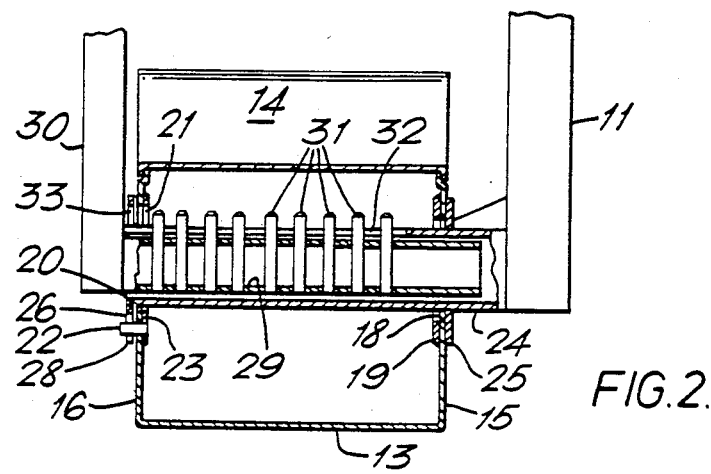
FIG. 2 is an end elevation, partly in section, of a chock forming part of the device of FIG. 1.

The stem 5 has a foot in the form of a channel 44 having a web 45, a short back or inner flange 46 and a long front or outer flange 47. The channel 44 can be lowered upon the channels 9 and 10 when the latter are engaged together (FIG. 5). Once the channel 44 is in its position shown in FIG. 6, the chock arms 3,4 cannot be pulled apart longitudinally and the chocks are secured together. The chock arm channel 9 has a depending plate 49 welded to its lower outer corner and aligned with the web of channel 9. Reinforcing ribs 50 are welded between the lower flange of the channel 9 and the plate 49. The plate 49 has a series of apertures 52 for the bolt 36 of the lock 6. The lock 6 is housed in a housing 35 welded to the deep front flange 47 of the channel 44. The housing 35 has a front plate 37 and the flange 47 has a cut-out 38 whereby the lock can be fitted only from the back of the flange. The lock is held in position by pins 39. A depending lug 40 is welded to the bottom of the housing 35.

The plate 49 has a turned up lip 48 in which a series of tapering mouth notches 51 are cut. Between the notches 51, the upper edge 53 of the lip 48 is plain. When the stem 5 is fitted over the chock arms 3,4 by lowering the channel 44 over the inter-engaged channels 9 and 10, the lug 40 will usually come to rest on a plain portion of the edge 53. The stem is then slid sideways until the lug 40 drops into one of the notches 51. Then the lock bolt 36 will be in alignment with one of the apertures 52, and can be locked to lock the immobilisation device. It should be noted that the lower edge of the flange 47 is within the bight of the upturned lip 48, which feature contributes to the tamper-resistance of the device.

For added security, a padlock (not shown) may be fitted through an aperture 54 in the flange 47 and the aperture 52 in the plate 49, with which the aperture 54 is aligned. The aperture 54 is surrounded by a reinforcing plate 55.

The stem 5 includes a channel-shaped upright member 56 extending vertically upwards from and welded to the web 45 of the foot channel 44. The member 56 has an open side facing inwardly. On its outer face a channel 57 is welded to its front web to form a tube of rectangular section for an anti-bolt cropper strip 68 for a crimped rod 70 by which the top hook 7 is carried by the stem 5. The crimped rod 70 extends within a rotatable stem tube 71, itself housed within, and rotatable with respect to, the member 56. At its lower end, the tube 71 has a spigot 72, of fast screw thread formation which engages in a nut plate 73 riveted to the web 45 of the channel 44. The spigot 72 extends freely through a hole 69 in the web 45 of the channel 44. When the stem is fitted to the chock arms 3,4, by being dropped onto them, the threaded spigot 72 engages upper flange of the channel 9, and the tube 71 is moved upwards with respect to the stem 5 and at the same time is rotated by inter-action between the fast screw thread of the spigot 72 and the nut plate 73. The upper end of the rotatable stem tube 71 has a welded-on key hole slot plate 74. A similar key hole slot plate 75 is welded to the top of the fixed vertical member 56. At a set of spaced positions along the length of the crimped rod 70, crimps 76 are upset by stamping during manufacture to form projecting teeth at these positions. The shapes of the key hole slots in the key hole plates 74 and 75 conform to the outline of these teeth and permit passage of the rod 70 through the plates, when the key hole slots are aligned. If the key hole slots are not in alignment, as when the plate 74 is rotated relative to the plate 75, the vertical position of the rod 70 relative to the plate 75 on the vertical member 56 is fixed. The key hole slots in the plates 74 and 75 are aligned when the rotatable stem tube 71 is in its lower position. Then the crimped rod 70 can be passed freely up and down in the stem tube to adjust the height of the device. When the stem 5 is fitted to the chock arms, as described above, the stem tube 71 is lifted and rotated with the plate 74. The key hole slot in the plate 74 passes out of alignment with the crimps 76 of the rod 70 and the height of the device is securely set.

Figure 10:
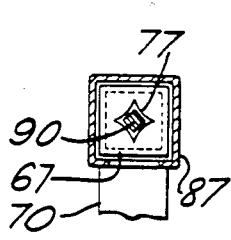
FIG. 10 is a vertical side sectional view on the line X—X of FIG. 8.

The crimped rod 70 and anti-bolt cropper strip 68 are both welded together at their upper ends and to a square section tube 64. At the rear or inner end of the tube 64 a nut box 65 is provided comprising two square nut plates 66,67 having apertures 77, essentially square but relieved at the corners (FIG. 10), and a further piece of tube 78 between the nut plates. The nut box 65 is welded to the tube 64. The apertures 77 in the nut plates 66,67 are set at such an angle to each other that a twisted square section steel bar 90 can threadedly pass through them. The bar 90 provides a fast screw thread, i.e. one in which internal friction is such that longitudinal force causes rotation.

The twisted bar 90 has a plain rear section 79 rotatably accommodated in a square section tube 80 having the same section as the tube 64. Welded to each end of the tube 80 are plates 81,82 having circular apertures for the section 79. A square section collar 83 of tube is welded to the bar 90 between the twisted section and the section 79 to axially locate the bar at the plate 81. A circular collar 84, threaded and welded onto a spigot 85 of the bar 90, axially locates the bar 90 at the plate 82.

A rear hook arm 86 is welded to the rear end of the square section tube 80, with a reinforcing fillet 93. A shoe sleeve 87 of square section tube, having a lower slot 92 to accommodate the arm 86, is slidable on the tubes 64,80. To a plate closing the rear end of the shoe sleeve 87, a "b" shaped piece is welded, pivotally supporting the upper end of a clip 88. A stirrup 89 welded to the arm 86 can releasably hold the clip thereto. The lower end of the clip 88 has a crook 91 shaped to engage the lower end of the arm 86.

Figure 11:
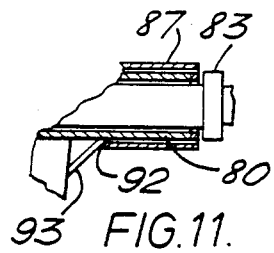
FIG. 11 is a scrap view of part of FIG. 8 with the parts in a different position.

The shoe sleeve 87 is slid back until the end of the slot 92 engages the reinforcing fillet 93, when the collar 83 is clear of the end of the sleeve 87, as shown in FIG. 11. In order to strengthen the hook when extended, the sleeve 87 may be longer than shown and have slots in its side walls to allow the collar 83 to rotate when aligned with the additional slots with the end of the slot 92 engaging the fillet 93.

For adjustment of the bight between the arm 86 and the crimped rod 70, the end 91 is disengaged from the arm 27, so that the shoe sleeve 87 can be slid back to expose the collar 83.

When the arm 86 and the bar 70 are urged towards or away from each other, the twisted bar 90 is caused to rotate with the square section collar 83. When the desired adjustment is achieved, the sleeve 87 is slid back to its previous position, thereby preventing rotation of the collar 83 and bar 90 and setting the bight of the top hook. The clip 88 is then returned to its position alongside the arm 86 within the stirrup 89 and with its bottom end engaged around the bottom end of the arm 86.

The clip 88 pivoted to the rear bottom edge of sleeve 87 passes through the stirrup 89 welded to the arm 86 intended to engage behind the wheel of the vehicle to be immobilised. The crook 91 passes around the wheel side of the arc 86, so that the sleeve 87 can only be slid back for adjustment of the top hook when the crook 91 is free to move outwardly or forwards. This is not the case when the device is fitted because the crook would foul the wheel.

The wheelnut shield 8 has a central carrier 58 welded to the outer face thereof. The carrier 58 comprises top and bottom lugs 59,60 supporting between them an upright channel 61. On either side of the channel 61, two side plates 62,63 are welded to the shield 8 at a position to embrace the fixed vertical member 56. In line with a large central aperture 94 in the shield, the channel 61 is apertured to allow the passage of a threaded stud 95 having a wing nut 96. The stud 95 is welded to the web of a channel-shaped member 97 with a spring 98 surrounding the stud between the webs of the channel 61 and the member 97, urging the member 97 forwardly and outwardly away from the channel 61. The flanges of the member 97 have lips 99 overlapping and aligned with flanges 100 of the channel 61. The flanges of the member 56 also have lips 101, located between the flanges 100 and the lips 99. When the wing nut 96 is tightened the lips 101 of the member 56 are gripped between the lips 99 and the flanges 100. Thus the wheelnut shield 8 can be secured on the stem 5 at a selected height. For increased engagement of the lips 99 and the flanges 100, they may be provided with inter-engaging cut-outs (not shown).

Operation

In order to use the device to immobilise a vehicle, the chocks and attached chock arms are separated from the stem with the top hook. The chock arm and inner hook of each chock are swung to the unlocked position (FIG. 4) clear of the tire face. The chock is then presented to the tire of the wheel of the vehicle to be immobilised whether from the end or the side as the bodywork dictates. The position of the inner hook is then altered to adjust the space between the chock arm and inner hook on each chock to the width of the vehicle wheel and tire to which the device is to be secured. The chock arm and the inner hook are then returned to the locked position (FIG. 3) to lock the inner hooks in position. The chocks are then on either side (in the direction of rotation) of the ground contact point of the vehicle wheel with the tire faces 14 of the chocks engaging the tire on the wheel. The edges of the flanges of the horizontal portions or channels 9 and 10 of the chock arms 3 and 4 pass each other and the spacing is sufficient to allow the peaks of the strips 41 and 42 to pass over each other. When the chocks are firmly in position, the channel 10 is inserted into the channel 9 (or the channel 9 is passed over the channel 10) in a direction normal to the direction of chock separation adjustment. The peaks of the strips 41 and 42 enter the corresponding troughs of the strips 42 and 41. If there is any non-alignment, the inclined portions of the strips ride over each other to cause relative movement of the channels 9 and 10 in the direction of chock separation adjustment so that the peaks reach an aligned position and can engage in the complementary troughs. The channels cannot then be separated in the direction of chock separation adjustment without disengagement in the direction normal thereto.

The spacing or bight between the rear hook arm 86 and the crimped rod 70 is adjusted to the width of the vehicle wheel and tire to which the device is to be secured, by disengaging the crook 91 at the bottom end of the clip 88, pivoting the clip upwards and drawing the shoe sleeve 87 fully to the rear to release the square collar 83 for rotation. The position of the arm 86 relative to the rod 70 is then adjusted, the twisted bar 90 rotating as it moves laterally through the nut box 65. When correctly adjusted, the shoe sleeve is returned and the clip replaced in position. The position of the wheel nut shield 8 is then adjusted on the vertical member 56 by loosening the butterfly wing nut 96, sliding the channel members 61 and 97 up or down the lips 101 of the member 56 and retightening the nut 96. The position of the crimped rod 70 in the member 56 is then adjusted so that the top hook 7 engages closely the top of the vehicle wheel tire over the ground contact point when the foot channel 44 is in position on the channels 9 and 10. Because the stem tube 71 rests on the nut plate 73 with the spigot 72 projecting through the hole 69 in the web 45, the crimped rod is free to move longitudinally in the tube 71 through the aligned key hole plates 74 and 75. The top hook 7 of the stem is slipped around and over the tire of the vehicle wheel and the foot channel 44 rested on the channel 9 with its flange 46 upon the upper flange of the channel 9. The top hook 7 is then lowered until the shoe sleeve 87 contacts the tire or is slightly spaced above it. The foot channel 44 is then pushed inwardly and downwardly to engage over the channels 9 and 10. During its descent, the spigot 72 engages the upper flange of the channel 9 and is thereafter prevented from descending. The nut plate 73 rotates the spigot 72 and stem tube 71 to move the key hole plate 74 out of alignment with the key hole plate 75 and prevent longitudinal movement of the rod 70 within the tube 71. As the channel 44 descends, the lug 40 enters one of the flared mouth notches 51 so as to align the bolt 36 of the lock 6 with one of the apertures 52 in the plate 49 attached to the channel 9. The lock is then operated to secure the bolt 36 in the aperture 52 and the vehicle is immobilised.

Alternatives

The invention is not intended to be restricted to the details of the above described embodiment. For instance, as shown, the spigot 72 is of twisted square section bar. For increased accuracy of rotation of the stem tube 71, the spigot could be of round bar with a thread ground in; and the nut plate 73 could be replaced by a complementary machined nut. To obviate loss of setting of the inner hooks 30 of the chocks, each extension 29 may be provided internally with a small tube welded between two opposite faces of the extension. The faces have holes in line with the bore of the small tube. This bore is threaded to receive an externally threaded ball catch, which is adjusted so that its ball engages the inside of extension 24 and creates sufficient friction for the inner hooks not to slip unintentionally when the chock arms 9,10 are swung up to their FIG. 4 position.

In order to assist in the location of the bottom of the stem in a correct position on the chock arms to be locked thereto, there may be provided on the underside of the web of the foot channel 44 and the topside of the upper flange of the channel 9, corrugated inter-engaging formations similar to the strips 41 and 42. These may be in addition to or in replacement of the lugs 40 and notches 51 in the lip 48. They have the effect of raising the level of the web 45 in relation to the adjacent flange of the channel 9, and the flanges 46 and 47 may need to be longer. Further the length of the spigot 72 may need alteration and its position carefully arranged to strike one of the peaks of the corrugated strip on the flange of the channel 9 as the foot channel 44 is dropped into position. The stem can then be accurately positioned longitudinally of the chock arms for alignment of the lock bolt with one of the apertures in the plate welded to the corner of the channel of one of the chock arms without conscious alignment during fitting. Any misalignment is taken up by the engagement of the inclined faces of the corrugated strips which cause lateral movement of the end of the stem longitudinally of the chock arms until the peaks of the upper strip lie in the troughs of the lower strip and the parts are aligned.

In an alternative illustrated in FIGS. 13 to 15, the chock arms and inner hooks cannot be swung about the chocks, but are released for lateral adjustment of their spacing by a separate member which may be obscured when the device is locked onto a wheel. Thus the lateral adjustment of the inner chocks and chock arms cannot be altered to reduce the security of the device. This alternative thus provides a vehicle immobilisation device of the type defined, characterised by including for each chock an outer chock arm for connecting the chock to the stem, an inner chock hook which is slidable laterally of the chock and chock arm to adjust the width between the inner hook and the chock are, and a hook locking arrangement to permit the adjustment in one angular position thereof and to lock the chock arm and inner hook in an adjusted width position in another angular position of the hook locking arrangement.

The hook locking arrangement may include a turnable collar having shaped aperture to permit the passage of formations on the inner hook in one angular position of the collar only, and means by which the collar may be turned, which means is obscured in the non-adjustable position, when the device is locked onto a vehicle wheel.

The collar turning means may include a plate which projects from the tire face of the chock in the adjustable position, and is depressed by contact with a tire into a recess in the tire face to move the collar to the non-adjustable position.

In this alternative, the chocks are similar but complementary in mirror image fashion, in other words left and right handed. The chock arm portion 11 (FIG. 15) has a tubular extension 314 of square section welded at right angles to the end thereof. The tubular extension passes through an aperture in an outer side face 313 of the chock 1A and carries a collar 312 by which it is welded to the outside of the face. At the rear end of the extension 314, there is a rimmed washer 315 to which the extension 314 is welded around an aperture therein.

The rimmed washer 315 is welded inside the inner side face 316 of the chock. The extension 314 has an axial slot 317—in alignment with a slot in the washer 315—and axially slidably accommodates a square section tubular extension 318 welded at right angles to the end of an inner hook 319. Spigots 320 welded to the tubular portion 318 extend into the slot 317.

The rimmed washer 315 encloses an aperture 322 in the face 316 surrounded by a reinforcing washer 321 welded to the inside of the face 316. Within the aperture 321 is turnably accommodated a collar 323 having a notch 324 which can be aligned with the slot 317 in the guide tube 314 in one limit position of the collar. The collar 323 is held in the aperture 322 by an integral external flange 325 and a welded-on inner flange 326 with a cranked lever arm 327 extending through an opening 328 in the rim of the washer 315. An actuating arm 329 is pivotally pinned to the arm 327 and slidably extends through a slot in the curved tire face 330 of the chock 1A at a depression 331 shaped to receive an actuating plate 332 welded to the free end of the arm 329. The plate 332 normally forms a continuation of the tire face 330. A cut-out 333 in the inner face 316 and the depression 331 allows access to behind the plate 332 which can be raised from the face 330 when the chock is to be adjusted to the width of a vehicle wheel.

Raising of the plate 332 brings the arm 327 to bear against against an edge 334 of the opening 328 in a limit position of the collar 323 such that its notch 324 is aligned with the slot 317 and the extension 318 of the inner hook 319 can be slid axially within the guide tube 314, the spigots 320 passing through the notch 324 in the collar 323 for adjustment of the hook 319. When the spacing of the hook 319 and chock arm portion 11 has been set, depression of the plate 332 rotates the collar 323 so that an unnotched portion intervenes between two spigots 320 (or outside the spigot nearest the hook) and the hook is locked.

When the chock is fitted against a vehicle wheel and locked to the rest of the immobilisation device the vehicle wheel tire abuts the plate 332 so that the latter cannot be raised and thus prevents the collar 323 being turned. The hook 319 thus remains captive and is not rotatable with respect to the chock.

Turning now to FIG. 16, there is shown an alternative arrangement for locking the position of a wheelnut shield 8. As in the FIG. 6 arrangement, a crimped rod 110 extends vertically within a rotatable circular stem tube 1, whilst these members are accommodated within a vertically extending fixed member 56. This latter has inwardly extending lips 101 (along its whole length except at the bottom end of the member 56 for fitting of the wheelnut shield 8) inside which engage lips 103 of a channel member 104 fast with the shield 8. The member 104 is welded between plates 105 themselves bridging cheek plates 107 welded to the shield 8. The member 104 has welded to it a nut 108 in which is threaded a "butterfly" bolt 109 having a point for engaging in a selected one of a number of dimples 112 in a composite channel member 113.

This member 113 comprises an outer channel member 114 and a quadrant member 115 welded thereto. The curvature of member 115 is such that it lies close to the tube 111. The adjustment of the wheelnut shield is set by moving it to its desired height with the bolt 109 freed off and then engaging the bolt in the selected dimple 112. The reaction force of engagement is taken at the lips 101,103.

Referring now to FIGS. 17 to 19, at the upper end of composite channel member 113, the quadrant member 115 terminates short of the end of the outer channel member 114. At this level, lugs 116 extending from the flanges of the member 114 abut the lips 101 on their outside. A key hole slot plate 117 welded on top of the member 56 has a turned down rear tongue 118 which abuts the inside of the member 114. A screw 119 passing through the member 114 engages in the tongue 118, thereby securing the upper end of the composite channel member 113. At its lower end, the quadrant member 115 again stops short, (FIG. 17). The flanges of the outer channel member 114 terminate just above the level of the upper web of a foot channel 120, similar to the channel 44. The web 121 of member 114 is joggled out to abut the rear flange of the foot channel 120. The flanges of the outer channel member 114 have lugs 122 abutting the top web of the foot channel 120. Countersunk screws 123 passing from within the channel 120 engage in the lugs 122 thereby securing the lower end of composite channel member 113.

Figure 21:
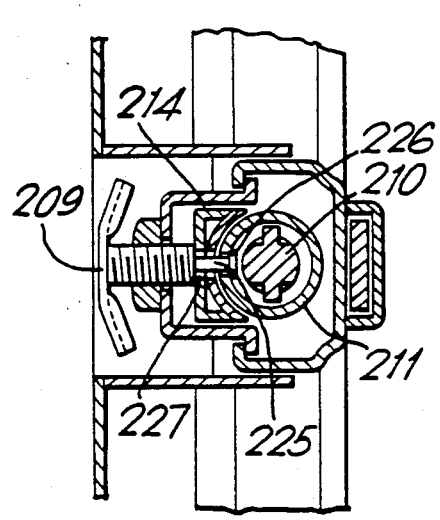
FIG. 21 is another view similar to FIG. 12 showing another alternative wheelnut shield locking arrangement.
Figure 22:
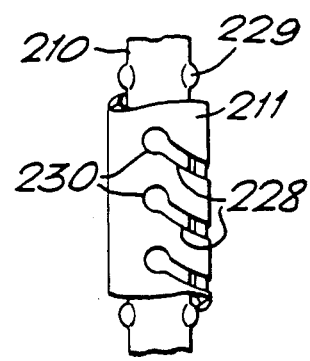
FIG. 22 is a scrap side view of the rotatable tube of FIG. 21.
Figure 24:
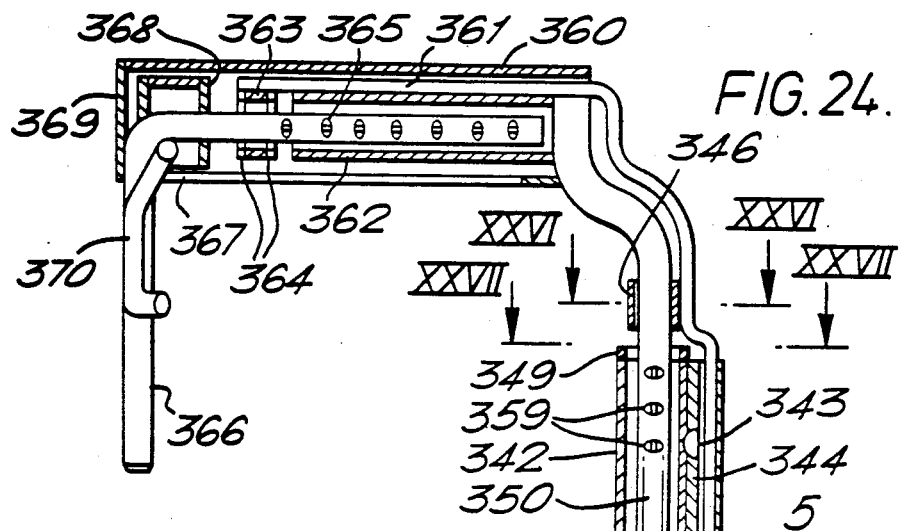
FIG. 24 is a cross-sectional view, partly broken away, of an alternative embodiment of the device according to the invention, similar to that of FIGS. 6 and 8.
Figure 25:
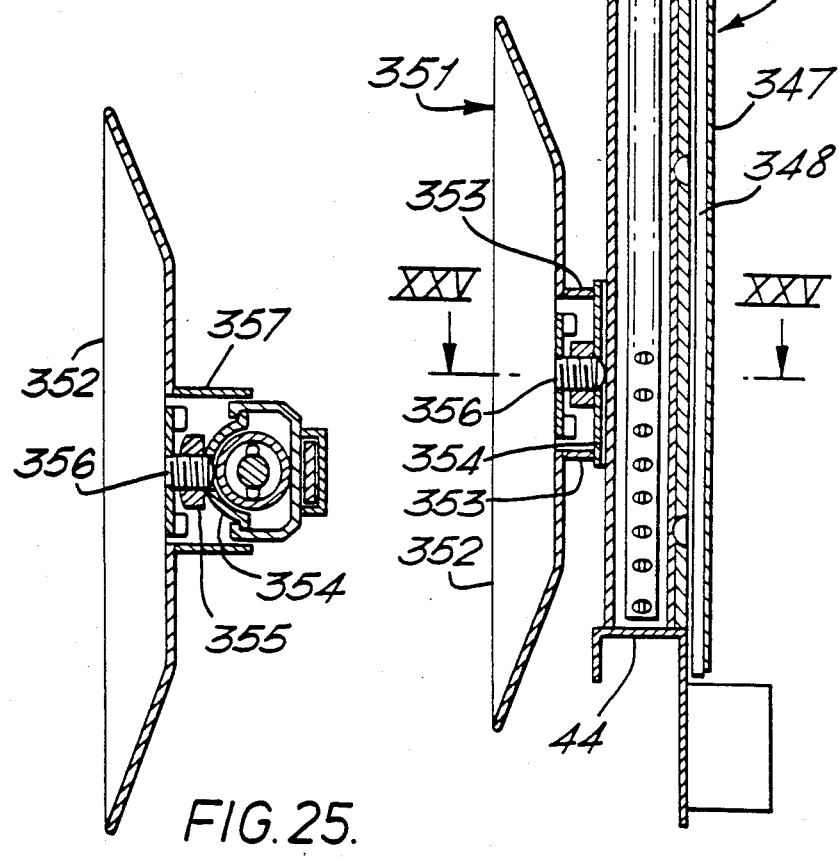
FIG. 25 is a sectional view on the line XXV—XXV of FIG. 24.

FIGS. 21 and 22 show a slightly different arrangement, wherein a butterfly bolt 209 has a pin 225 at its forward end. The pin has a head 226 at its extremity, the head being of slightly larger diameter than the pin. A composite channel member 214 has a series of bores 227 as opposed to the dimples 112. The bores are each of sufficient size for the head 226 to pass through, whilst the main threaded portion cannot. Thus when the bolt 209 is tightened the step between the pin 225 and the main threaded portion bears against the channel 214 thereby securing the wheelnut shield 8. As shown in FIG. 22, a rotatable stem tube 211 has a series of angled slots 228 at the same pitch as the crimps 229 in a crimped rod 210. The slots 228 have enlarged ends 230 of sufficient size for the head 226 of the bolt 209 to pass through. The angled portion of each slot is of such a size that the pin 225 can slide therealong. The angle of the slots is such that when the tube 211 is lifted and turned, the pin 225 passes along a selected one of the slots.

When the height of the wheelnut shield 8 is being set, the head 226 of the bolt 209 passes first through a selected one of the bores 227 in the channel member 214 and then through the enlarged end 230 of a corresponding one of the slots 228. On fitting of the device to a wheel, the tube 211 turns and captivates the head 226. Thus the wheel nut shield cannot be removed by unscrewing of the bolt 209 in the unlikely event of the bolt being accessible for unscrewing.

Figure 20:
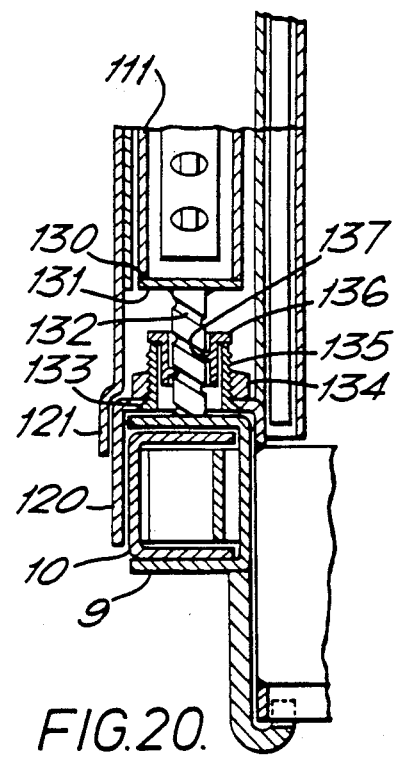
FIG. 20 is a scrap sectional side view of the bottom end of the channel shown in FIG. 18.

Turning now to FIG. 20, there is shown a nut arrangement for turning the tube 111. The lower end 130 of the tube has a blanking plate 131 from which depends a ground helically grooved pin 132. At a chamfered aperture 133 in the channel 120, a hollow chamfer head bolt 135 extends up through the channel and is secured by a nut 134. A brass bush 136 having a helical protrusion 137 into its bore is sweated into the bolt 135. The helical protrusion 137 engages in the ground groove of the pin 132. When the foot channel 120 of the stem 5 of the device is fitted onto the channels 9 and 10 of the chock arms, the pin 132 abuts the upper flange of the channel 9 and is lifted and turned until its bottom end is substantially flush with the internal surface of the top web of the channel 120.

Referring to FIG. 18, there is shown an arrangement 140 for temporarily holding the height of the top hook prior to fitting the device. A nut 141 is welded to the upper end of a front channel 102. In the nut 141 is threadedly accommodated a ball catch 142. An anti-bolt cropper strip 106 has a series of dimples 143 in step with the crimps of the bar 110. The ball catch is screwed in sufficiently tight for the engagement of its ball 144 with a selected one of the dimples to support temporarily the top hook at a selected height.

Figure 23:
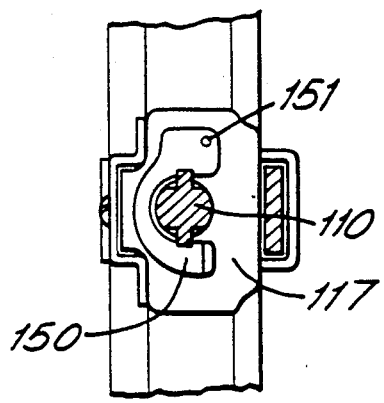
FIG. 23 is a view similar to FIG. 19 showing a variant.

FIG. 23 shows another such arrangement in the form of a horse shoe plate 150 pinned to the key hole slot plate 117 by a single rivet pin 151. The horse shoe engages around the crimped bar 110 between crimps, whereby the bar cannot move up or down until the plate 150 is swung out of the way about its rivet 151.

In another alternative, illustrated in FIGS. 24 to 27 the stem 5 has a compound structure. Centrally it has a stem tube 342 to which is plug welded at 343 a formed section member 344. This in turn is welded to the channel foot 44. A channel section 347 is welded along the front of the member 344, to define a rectangular void in which is received an anti-bolt cropper strip 348. A keyhole slot plate 349 is welded to the top of the compound structure. Through the plate 349 a crimped rod 350 extends.

A wheelnut shield 351 is adjustably received on the back of the stem. It comprises a dished shield member 352 having lugs 353 attaching a formed member 354 engaging with an opening at the back of the formed member 344. The member 354 carries a nut 355 by means of which a wing bolt 356 can be urged into engagement with a selected one of a series of dimples provided along the length of the tubular stem tube 342. To prevent tampering, side pieces 357 are welded to the shield member 352.

Spaced crimps 359 on the rod 350 are formed by stamping. The rod is held to the strip 348 by a collar 346 welded to the strip above the crimped portion of the rod. With the rod in its angular position shown in FIG. 24, it cannot be moved longitudinally of the stem tube 342 because of engagement of the crimps with the keyhole slot plate 349 (FIG. 27). If the rod is turned through 90°, it may be moved up and down to a selected position to suit the wheel to which the device is to be fitted. Once adjusted the rod is turned back to its FIG. 24 angular position with a crimp 359 on either side of the plate 349 and thus the length of the stem is locked.

Rotation of the rod 350 is under the control of a sleeve 360 slidingly engageable over a bent back part 361 of the strip 348 and a tubular finger 362 welded to the upper end of the rod 350 at right angles thereto. The rear end of the part 361 has a short length of tube 363 welded to the underside thereof. Both ends of the tube 363 have keyhole slot plates 364 welded thereto—two being provided for finer adjustment. With the sleeve 360 slid back, another crimped rod 365, forming part of the top hook 7, can be adjusted, by turning it in the keyhole slot plates 364 through which it extends, to set the length of the top hook. The rod 365 has a depending part or inner hook 366 for engaging behind the wheel. The part 366 extends out of the sleeve 360 via slot 367 which permits withdrawal of the sleeve. A guide block 368 is welded to the rod 365 at its bend and engages inside the sleeve 360 which is of fabricated construction, having a rear closure plate 369. For holding the depending part 366 against the plate 369 to lock the sleeve 360, a spring clip 370 is provided. This engages around the forward side of the part 366 which is against the wheel in use of the device whereby the clip cannot be removed when the device is in use. For further security the end of the clip engaged in the sleeve may do so in a keyhole slot for capturing the end of the clip which is bent at right angles. For added security a screw may be provided for locking the sleeve, the screw having its head beneath the sleeve whereby it cannot be removed when the device is in use.

In alternative arrangement, the short length of tube 363 with its keyhole slots 364 is welded not to the rear end of the part 361, but to the rear end of the tubular finger 362.

In another alternative arrangement shown in FIG. 28, the vertical crimped rod 400 has a solid square section 401 welded to it. The section 401 has a rear drilling into which is fitted and welded at 402 a rod 403 also having crimps 404. An anti-bolt cropper strip 405, in its closed position of the adjustment, has a top angled portion 406 lying along the top of the square section 401. A rectangular section sleeve 407 captivates the portion 406 and section 401 together when in its closed, FIG. 28 position. Within the sleeve 407 and surrounding the rod 403 is a square section tube 408 having a lateral dimension to be a sliding fit in the sleeve and a height, in conjunction with a welded-on shoe 409, also suitable for a sliding fit. A rear hook arm 410, is welded to the rear end of the tube 408 and extends down out of the sleeve 407 via a slot 411 at an off vertical angle.

Figure 8:
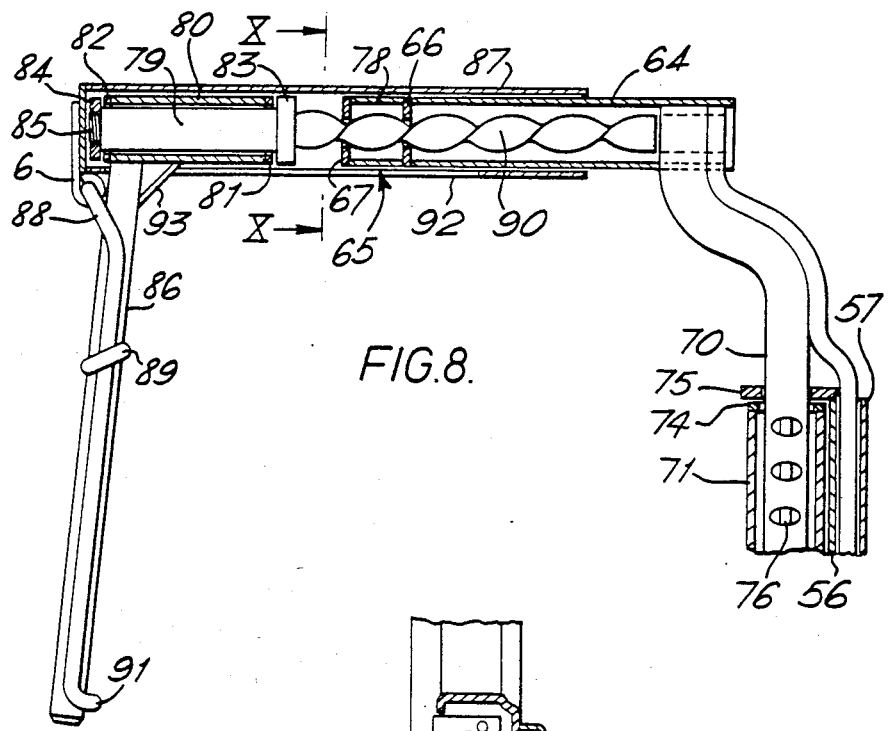
FIG. 8 is a sectional side view of parts broken away from FIG. 6 on the line VI—VI of FIG. 1.
Figure 9:
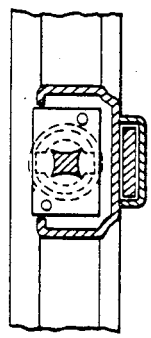
FIG. 9 is a sectional plan view on the line IX—IX of FIG. 6.

The forward end of the tube 408 has a pair of key hole slot plates 412 welded thereto and spaced by a short length of tube 413. In the FIG. 28 position, the key hole slots do not align with the crimps 404, whereby the width of the top hook between the crimped rod 400 and the arm 410. For adjustment, the sleeve 407 is slid back, whilst remaining captivated to the tube 408 via a clip 414, such as described with reference to FIG. 8 until the full length of the section 401 is exposed. Then the tube 408, together with the sleeve 407 and the arm 410, can be rotated for passage of the crimps through the key slots. Once the desired separation is set the components are rotated back and the sleeve slid back.

Turning now to FIGS. 29 to 31, there is shown an alternative to the stem length adjustment arrangement of FIGS. 1 to 12. This stem contains centrally a twisted square section bar 451 which is rotatable. At its lower end it is held longitudinally by a split collar 452, 453 engaging in a groove 470 in the bar 451. One half 452 of the collar is welded to a shaped member 454 analogous to the shaped member 56 above. The other half 453 of the collar is welded to a compound member 455 analogous to the compound member 113 above, the compound member 455 being secured in a similar manner to the compound member 113. Below its groove 470, the bar 451 has an untwisted section 456 carrying a square section head 457 with a square section point 458 directed downwards. The point is directed centrally in a square aperture 459 in the foot channel 44. This aperture has a reinforcing rim 460. Within the aperture is slidingly accommodated a dog 461 in the form of a short length of square section tube with an upper lip 462 to prevent it falling through the aperture. The square head 457 is sized to pass into the dog 461 when the latter is lifted on fitting of the device to a vehicle wheel. Then the twisted square section bar is irrotationally held.

A square tube 463 surrounds the twisted bar 451 and is welded at its upper end to a swan neck 464 extending to a top hook similar to that described with reference to FIGS. 1 to 12. The tube 463 is slidingly accommodated between the shaped member 454 and the compound member 455 as shown in FIG. 30. (The arrangement of the latter two members permits a wheelnut shield to be secured as in the alternative of FIG. 25.) The upper end of the square tube 463 is guided in a length of large square tube 464 welded to the upper end of the shaped member 454. The lower end of the tube 463 has welded on a plate 465 with a clearance bore for the bar 451, a short length of similar tube 466 and a further—nut—plate 467 having an aperture shaped to engage with the twisted bar 451.

As the top hook is raised or lowered with the stem 5 not fitted to the chock arms, i.e. with the dog 461 in its lower position, the twisted bar 451 spins due to engagement with the nut plate 467. When the stem is fitted, the dog 461 is lifted and initially engages the square section point 458 turning it in the process. On further lifting of the dog, it passes around the head 457 which will have become aligned with the dog, FIG. 31. The twisted bar 451 is then irrotationally held preventing longitudinal movement of the tube 463 and of the top hook.

Industrial Applicability

Vehicle immobilisation devices according to the invention find use both as anti-theft devices and for discouraging the parking of vehicles in unauthorised positions or without payment of proper parking dues. The corrugated strips in the chock arm channels positively prevent telescopic action between the channels. The device is of steel construction, any thin members of importance in holding it together being case-hardened to prevent sawing through.

I claim:

1. A vehicle immobilisation device comprising:
   a pair of chocks for abutting a vehicle wheel in front and behind (in a direction of rotation) its ground contact point respectively;
   a top hook for hooking over the wheel at a point over the ground contact point;
   a pair of chock arms for interconnecting the chocks, each said chock arm being secured to its one of said chocks, said chock arms being relatively movable to adjust the separation of said chocks;
   a stem interconnecting said top hook and said chock arms;
   locking means for locking said pair of chock arms and said top hook together in their respective positions whereby to captivate the vehicle wheel; and
   each said chock arm having:
   at least one engagement member extending from one lateral side of said chock arm for interengagement with said engagement member of the other of said chock arms at one of a plurality of relative positions corresponding to positions in which the said chock arms and said top hook are lockable;
   said engagement members being interengageable by relative lateral movement towards each other in a direction transverse to the direction of chock separation adjustment to prevent relative movement of said chock arms, and being disengageable by relative lateral movement away from each other in the transverse direction to permit such relative movement; and
   said stem having:
   at least one depending stem member arranged to engage said chock arms on downwards fitting of said stem to said chock arms to prevent lateral disengagement of them when said stem is downwardly fitted for interconnecting said top hook with said chock arms;
   said stem being lockable to said chock arms, with said engagement members interengaged, to prevent relative movement in the disengagement direction.

2. A vehicle immobilisation device according to claim 1, wherein said engagement members have complementary inclined interengagement formations which, upon relative lateral movement in the engagement direction at a relative position other than one of the plurality, engage and cause relative movement in the direction of chock separation adjustment until one of the plurality of relative positions is reached.

3. A vehicle immobilisation device according to claim 2, wherein said engagement members each comprise a corrugated steel strip welded along its chock arm with corrugations extending laterally of the length of said strip to provide said formations, said corrugations providing said inclined engagement formations.

4. A vehicle immobilisation device according to claim 26, wherein said chock arms each comprise a steel channel to the inside surface of the web of which its corrugated strip is welded, said steel channel of one chock arm being of a size to fit partially around said steel channel of the other chock on interengagement of said corrugations of said strips with the flanges of said channels interengaging to control relative alignment of said chock arms and to prevent said chock arms from individual pivotal movement about said chocks.

5. A vehicle immobilisation device according to claim 1, wherein said stem has a foot and said foot has a pair of said stem members which are engageable with opposite sides of said chock arms with said engagement members laterally interengaged, to prevent relative movement in the disengagement direction.

6. A vehicle immobilisation device according to claim 4, wherein said stem has a foot and said foot is a downwards open steel channel which is engageable at its flanges with the outside surfaces of the webs of said channels of said chock arms when said corrugations are laterally interengaged, said foot channel being engageable by movement in a downwards direction.

7. A vehicle immobilisation device according to claim 1, wherein said stem has a positioning formation and one of said chock arms has a set of formations in a selected one of which said stem-positioning formation is engageable in a selected position, in which said stem is lockable to said chock arms.

8. A vehicle immobilisation device according to claim 7, wherein said stem-positioning formation is a tongue; said one chock arm has a plate extending down from it and having an upturned lip; and said set of formations is a series of notches in said upturned lip.

9. A vehicle immobilisation device according to claim 8, wherein said stem has a foot having two flanges engageable with said chock arms to prevent relative movement thereof; a lower edge of the front one of said flanges is accommodated between said upturned lip and said plate, thereby being protected; and said tongue is provided on said front flange.

10. A vehicle immobilisation device according to claim 8, wherein said locking means comprises a lock carried by said front flange and having a lockable bolt extending in a locked position rearwardly from said front flange; and said plate extending down from said one chock arm has a series of apertures in a selected one of which said lockable bolt engages, with said tongue engaged in a selected one of said notches.

11. A vehicle immobilisation device according to claim 8, wherein said locking means comprises an aperture in said front flange and a series of apertures in said plate extending down from said one chock arm, said aperture in said front flange being aligned for padlocking with a selected one of said series of apertures, when said tongue is engaged with a selected one of said notches.

12. A vehicle immobilisation device according to claim 1, wherein there is provided for each said chock an outer chock arm which is pivotally connected to its chock, and an inner chock hook which is pivotable with said chock arm, is relatively slidable laterally of said chock arm to adjust the spacing between itself and said chock arm in one pivotal position of said chock arm and said inner hook in said chock, and is locked in an adjusted spacing position in another angular position of said chock arm and said inner hook in said chock, in which position said device is usable to enable said chocks and said top hook to be locked together.

13. A vehicle immobilisation device according to claim 12, wherein said chock arm of each said chock is restricted in its angular pivotal movement in said chock, so as to be pivotable between the one pivotal position in which said inner hook and said chock arm are free for spacing adjustment and another angular position in which said chock arm is correctly disposed to said chock for attachment and locking to said other chock arm and said stem.

14. A vehicle immobilisation device according to claim 12, wherein in the one pivotal adjustment position, said inner hook and said chock arm are aligned when viewed from the side and clear of a vehicle wheel tire engagement face of said chock.

15. A vehicle immobilisation device according to claim 12, wherein:
   each said outer chock arm has an angled tubular extension journalled in front and rear sides of its said chock;
   each said inner chock hook has an angled tubular extension slidingly accommodated within said tubular arm extension;
   each said tubular arm extension has an axial slot;
   each said tubular hook extension has a series of pins rigid with it and extending out through said slot; and
   each said rear wall of said chock has a notch;
   the arrangement being such that when said chock arm is in its one angular position said pins can pass through said rear side wall via said notch for spacing adjustment and in the other angular position, said pins cannot pass through said notch whereby the spacing of said chock hook from said chock arm is locked.

16. A vehicle immobilisation device according to claim 1, wherein said stem includes two relatively longitudinally movable members, one connected to said top hook and the other adapted to be locked to said chock arms; one of said movable members having formations at spaced intervals; the other movable member having a key member for engagement with said formations; said key member in one position thereof allowing free longitudinal movement between said movable members and being rotatable to another position in which such longitudinal movement is prevented.

17. A vehicle immobilisation device according to claim 1, wherein said stem includes two relatively longitudinally movable members; one connected to said top hook, having discrete, aligned formations at spaced intervals and being rotatable in a non-operative condition of said top hook; said other movable member being adapted to be locked to said chock arms and having a plate with an aperture through which said one movable member extends; said apertured plate preventing relative longitudinal movement of said movable members by engagement with said formations in the operative position of said top hook of said device, and said apertured plate allowing such movement when said one movable member is rotated to engage with said formations.

18. A vehicle immobilisation device according to claim 1, wherein said top hook includes:
   two relatively longitudinally movable members;
   a screw threaded part caused to rotate by relative longitudinal movement of said members; and
   a sleeve external to said two members for preventing rotation of said screw threaded part, said sleeve being slidable to release said screw threaded part for rotation.

19. A vehicle immobilisation device according to claim 18, wherein said sleeve has a sleeve lock engageable behind the vehicle wheel tire, when said device is fitted, to prevent sliding of said sleeve to its position of release for rotation of said screw threaded part.

20. A vehicle immobilisation device according to claim 19, wherein:
   one of said two movable members comprises a first square tube having a nut welded to one end and a stem connection part welded to the other end; and
   the other of said two movable members comprises:
   a screw threaded bar engaged with said nut;
   a square section collar rigid with said screw threaded bar at its read end;
   a round bar rigid at its front end with said square section collar;
   a second square tube rotatingly accommodating said round bar and longitudinally captive thereon, said second square tube being of the same section as said first square tube; and
   a rear hook arm depending from said second square tube; and said sleeve lock comprises:
   a clip pivoted at its upper end to the rear end of said rear hook intermediate its arms and clipped at its lower end to the front side of said rear hook arm.

21. A vehicle immobilisation device according to claim 1, wherein each said chock arm is pivotally connected to its chock and has:
   at least one further engagement member extending laterally of said arm for interengagement with said further engagement member of the other of said arms said further engagement members having upper and lower surfaces for controlling relative alignment of said chock arms and preventing said chock arms from individual pivotal movement about said chocks.

22. A vehicle immobilisation device comprising:
   a pair of chocks for abutting a vehicle wheel on either side of its ground contact point;
   a top hook for hooking over the wheel at a point over the ground contact point;
   a pair of chock arms for interconnecting the chocks, each said chock arm being secured to its one of said chocks, said chock arms being relatively movable to adjust the separation of said chocks;
   a stem interconnecting said top hook and said chock arms;
   locking means for locking said pair of chock arms and said top hook together in their respective positions whereby to captivate the vehicle wheel; and
   each said chock arm having:
   at least one engagement member for interengagement with said engagement member of the other of said chock arms at one of a plurality of relative positions corresponding to positions in which the said chock arms and said top hook are lockable;

said engagement members being interengageable by relative movement towards each other in a direction normal to the direction of chock separation adjustment to prevent relative movement of said chock arms, and being disengageable by relative movement away from each other in the same direction to permit such relative movement;

said stem being lockable to said chock arms with said engagement members interengaged, to prevent relative movement in the disengagement direction;

said stem including two relatively longitudinally movable members, one connected to said top hook and the other adapted to be locked to said chock arms;

one of said movable members having formations at spaced intervals;

the other movable member having a key member for engagement with said formations;

said key member in one position thereof allowing free longitudinal movement between said movable members and being rotatable to another position in which such longitudinal movement is prevented; and said key member having a spigot for effecting the rotation of said key member by lifting and twisting of said spigot, by screwing engagement with said stem, during engagement of said stem with said chock arms.

23. A vehicle immobilisation device comprising:

a pair of chocks for abutting a vehicle weel on either saide (in a direction of rotation) of its ground contact point;

a top hook for hooking over the wheel at a point over the ground contact point;

a pair of chock arms for interconnecting the chocks, each said chock arm being secured to its one of said chocks, said chock arms being relatively movable to adjust the separation of said chocks;

a stem interconnecting said top hook and said chock arms;

locking means for locking said pair of chock arms and said top hook together in their respective positions whereby to captivate the vehicle wheel; and each said chock arm having:

at least one engagement member for interengagement with said engagement member of the other of said chock arms at one of a plurality of relative positions corresponding to positions in which the said chock arms and said top hook are lockable;

said engagement members being interengageable by relative movement towards each other in a direction normal to the direction of chock separation adjustment to prevent relative movement of said chock arms, and being disengageable by relative movement away from each other in the same direction to permit such relative movement;

said stem being lockable to said chock arms, with said engagement members interengaged, to prevent relative movement in the disengagement direction;

said stem including:

two relatively longitudinally movable members, one connected to the top hook and the other adapted to be locked to the chock arms, the one of the movable members carrying a nut the other of the movable members being in the form of a screw thread engaging with the nut; and a key member lifted, during engagement of the stem with the chock arms, for engagement with the threaded member, whereby the longitudinally movable members are free to move longitudinally when the stem is disengaged and they are prevented from moving longitudinally when the stem is locked to the chock arms.

24. A vehicle immobilisation device comprising:

a pair of chocks for abutting a vehicle wheel respectively in front and behind, in a direction of rotation its ground contact point;

a top hook for hooking over the wheel at a point over the ground contact point;

a pair of chock arms for interconnecting said chocks, each said chock arm being secured to its one of said chocks, said chock arms being relatively movable to adjust the separation of said chocks and adapted for interengagement at one of a plurality of relative positions;

a stem for interconnecting said top hook and said chocks, said stem having:

an upper portion connected to said top hook, a lower portion adapted to be fitted to said chock arms, said upper portion and said lower portion including respective longitudinally movable members, one of said movable members having a repetitive formation along its length, and key means accommodated on said lower stem portion for cooperating with said repetitive-formation movable member to substantially prevent longitudinal movement of said movable members—and separation of said portions—when said stem is fitted to said chock arms, said key means including:

a displaceable member for actuating said key means displaceably mounted on said lower stem portion for displacement between a free position relatively further from said top hook when said stem is not fitted to said chock arms and an engaged position relatively nearer said top hook, in which said displaceable member engages one of said chock arms on fitting of said stem thereto, whereby such longitudinal movement is prevented; and said stem being adapted for interengagement downwards with said chock arms when interengaged for lifting said displaceable member; and locking means for locking said pair of chock arms together and to said stem on fitting of said stem, whereby to captivate said wheel within said two chocks and said top hook.

25. A vehicle immobilisation device according to claim 24, wherein said movable member having said repetitive formation has discrete formations at spaced intervals; said other movable member has an apertured member for engagement with said formations, said apertured member in one position thereof allowing free longitudinal movement between said movable members and being rotatable to another position in which such longitudinal movement is prevent; and said displaceable member is a spigot for effecting the rotation of said key member by lifting and twisting of said spigot, by screwing engagement with said stem, during interengagement of said stem to said chock arms.

26. A vehicle immobilisation device according to claim 25, wherein:

said movable member connected to said top hook comprises a rod having spaced crimps and extending into said other movable member; and said other movable member includes a liftable and twistable stem tube concealed in said lower stem portion from front access and having:

a plate with a key hole slot, said plate being welded across the upper end of said stem tube for preventing longitudinal movement of said rod with respect to said tube when said crimps are out of alignment with said key hole slot;

a depending screw thread spigot welded to the lower end of said tube;

said lower stem portion has a nut in which said screw thread spigot engages and extends beyond to abut said one chock arm when said stem is interengaged therewith; and the weight of said stem tube causing it to drop when said stem is not fitted and to turn by engagement of said screw thread spigot and said nut so that said key hole slot aligns with said crimps for relative longitudinal movement of said rod and said stem, lifting and turning of said stem tube via said spigot and said crimps out of alignment occurring on fitting of said stem to said chock arms.

27. A vehicle immobilisation device according to claim 24, wherein said movable member connected to said top hook carries a nut; the other said movable member has its repetitive formation in the form of a screw thread which engages with said nut; and said displaceable member is a key member lifted during fitting of said stem to said chock arms, for engagement with said threaded member, whereby said longitudinally movable members are free to move longitudinally when said stem is disengaged and they are prevented from moving longitudinally when said stem is interengaged with said chock arms.

28. A vehicle immobilisation device according to claim 27, wherein:

said movable member connected to said top hook comprises a tube slidingly and irrotationally accommodated on said lower stem portion and having said nut attached to its lower end and said top hook attached to its upper end; said movable member in the form of a screw thread is journalled in and longitudinally secured to said lower stem portion adjacent its lower end with its threaded portion extending into said tube through said nut and has at its lower end a polygonal section head and a terminal point; and said key member is a polygonal tubular member liftingly and irrotationally accommodated on said lower stem portion for engagement with said chock arms whereupon it is lifted into engagement with said head for locking said screw thread member against rotation.

* * * * *